(12) United States Patent
Maruta et al.

(10) Patent No.: US 11,248,725 B2
(45) Date of Patent: Feb. 15, 2022

(54) THREADED CONNECTION

(71) Applicants: Nippon Steel & Sumitomo Metal Corporation, Tokyo (JP); Vallourec Oil and Gas France, Aulnoye-Aymeries (FR)

(72) Inventors: Satoshi Maruta, Tokyo (JP); Michihiko Iwamoto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 401 days.

(21) Appl. No.: 16/314,030

(22) PCT Filed: Sep. 15, 2017

(86) PCT No.: PCT/JP2017/033564
§ 371 (c)(1),
(2) Date: Dec. 28, 2018

(87) PCT Pub. No.: WO2018/052140
PCT Pub. Date: Mar. 22, 2018

(65) Prior Publication Data
US 2021/0231240 A1 Jul. 29, 2021

(30) Foreign Application Priority Data
Sep. 16, 2016 (JP) .............................. JP2016-181176

(51) Int. Cl.
*F16L 15/06* (2006.01)
*E21B 17/042* (2006.01)
*F16L 15/00* (2006.01)

(52) U.S. Cl.
CPC ............ *F16L 15/06* (2013.01); *E21B 17/042* (2013.01); *F16L 15/001* (2013.01)

(58) Field of Classification Search
CPC ....... F16L 15/06; F16L 15/002; F16L 15/004; E21B 17/042
(Continued)

(56) References Cited

U.S. PATENT DOCUMENTS

RE30,647 E * 6/1981 Blose .................. E21B 17/0423
285/334
4,629,223 A * 12/1986 Dearden ............... E21B 17/042
285/334
(Continued)

FOREIGN PATENT DOCUMENTS

CA 2932527 A1 * 6/2015 .............. F16L 15/06
CA 3026557 A1 * 3/2018 .............. F16L 15/06
(Continued)

OTHER PUBLICATIONS

Machine translation of DE 4345119C1.
(Continued)

*Primary Examiner* — David Bochna
(74) *Attorney, Agent, or Firm* — Banner & Witcoff, Ltd.

(57) ABSTRACT

A threaded connection connecting a pair of pipes includes a pin and a box. The pin has a male thread on its outer diameter. The box has a female thread on its inner diameter, the female thread corresponding to the male thread. The male thread includes constant-thread-width and varying-thread-width portions. The constant-thread-width portion has a constant thread-groove width. The varying-thread-width portion has a thread-groove width equal to or larger than the groove width of the constant-thread-width portion and gradually increasing, from the constant-thread-width portion toward the tip of the pin. The female thread includes constant-thread-width and varying-thread-width portions. The constant-thread-width portion has a constant thread-ridge width. The varying-thread-width portion has a thread-ridge width equal to or larger than the thread-ridge width of
(Continued)

the constant-thread-width portion and gradually increasing from the constant-thread-width portion toward the center of the box.

6 Claims, 9 Drawing Sheets

(58) Field of Classification Search
USPC .................................................. 285/333, 334
See application file for complete search history.

(56) References Cited

U.S. PATENT DOCUMENTS

| | | | | |
|---|---|---|---|---|
| 5,338,074 | A * | 8/1994 | Barringer | F16L 15/004 |
| | | | | 285/334 |
| 5,360,239 | A * | 11/1994 | Klementich | F16L 15/001 |
| | | | | 285/334 |
| 6,206,436 | B1 * | 3/2001 | Mallis | E21B 17/042 |
| | | | | 285/334 |
| 6,481,760 | B1 | 11/2002 | Noel et al. | |
| 8,925,975 | B2 * | 1/2015 | Granger | E21B 17/042 |
| | | | | 285/334 |
| 2002/0027363 | A1 | 3/2002 | Mallis et al. | |
| 2011/0278838 | A1 * | 11/2011 | Martin | F16L 15/001 |
| | | | | 285/333 |
| 2015/0130182 | A1 | 5/2015 | Sasaki et al. | |
| 2016/0115742 | A1 * | 4/2016 | Martin | E21B 17/0423 |
| | | | | 285/391 |

FOREIGN PATENT DOCUMENTS

| | | |
|---|---|---|
| CN | 105308257 A | 2/2016 |
| DE | 4345119 C1 | 5/1995 |
| EP | 3514432 A1 | 7/2019 |
| JP | 2002524712 A | 8/2002 |
| JP | 4087798 B2 | 5/2008 |
| JP | 2008527256 A | 7/2008 |
| WO | 2010069491 A1 | 6/2010 |
| WO | 2014199619 A1 | 12/2014 |
| WO | 2015083382 A1 | 6/2015 |
| WO | 2015105054 A1 | 7/2015 |

OTHER PUBLICATIONS

English Abstract & Family List of JP4087798B2.
English Abstract & Family List of WO2014199619A1.
English Abstract & Family List of JP2002524712.
English Abstract & Family List of WO2015105054A1.
English Abstract & Family List of WO2015083382A1.
English Abstract & Family List of JP2008527256A.

* cited by examiner

THREADED CONNECTION

RELATED APPLICATION DATA

This application is a National Stage Application under 35 U.S.C. 371 of co-pending PCT application number PCT/JP2017/033564 designating the United States and filed Sep. 15, 2017; which claims the benefit of JP application number 2016-181176 and filed Sep. 16, 2016 each of which are hereby incorporated by reference in their entireties.

TECHNICAL FIELD

The present invention relates to a threaded connection for connecting a pair of pipes.

BACKGROUND ART

In an oil well, a natural gas well etc. (hereinafter collectively referred to as "oil well"), an oil-well pipe such as casing or tubing is used to mine underground resources. An oil-well pipe is composed of a series of interconnected steel pipes. The steel pipes are connected using a threaded connection.

A threaded connection for steel pipe is generally categorized as coupling-type and integral-type. In the case of a coupling-type connection, a pair of pipes are connected where one of the pipes is a steel pipe and the other pipe is a coupling. A male thread is provided on the outer periphery of each end of the steel pipe. A female thread is provided on the inner periphery of each end of the coupling. As a male thread on the steel pipe is screwed into a female thread on the coupling, the steel pipe and coupling are made up and connected.

In the case of an integral-type connection, a pair of pipes are connected where both pipes are steel pipes, and no coupling is used. A male thread is provided on the outer periphery of one end of each steel pipe, while a female thread is provided on the inner periphery of the other end thereof. As the male thread on one steel pipe is screwed into the female thread on another steel pipe, the two steel pipes are made up and connected.

Usually, a portion of a pipe to be connected that has a male thread is referred to as pin, since it is inserted into a female thread. A portion of a pipe to be connected that has a female thread is referred to as box, since it receives a male thread. Since the pin and box each constitute part of a pipe, they are tubular in shape.

One known type of threaded connections for steel pipe has a thread with a thread-ridge width and a thread-groove width that change at certain rates. A threaded connection with this construction has high torque. In such a threaded connection, the stab lead and the load lead are usually constant over the entire thread length. However, the stab lead is not equal to the load lead.

Japanese Patent No. 4087798 discloses a threaded connection in which the stab lead and/or load lead begins(s) to change at a midway point on the thread length. That is, in the threaded connection of Japanese Patent No. 4087798, the rates of change in thread-ridge width and thread-groove width change at a midway point on the thread length. Thus, in connection with a threaded connection with varying thread-ridge width and varying thread-groove width, the resistance to tensile and compression stresses can be improved.

SUMMARY OF THE INVENTION

Typically, machining to create a thread is done using a cutting tool having a size corresponding with the minimum thread-groove width. As such, to cut a thread groove with a large thread-groove width, the number of cutting passes in the pipe-axis direction is necessarily large. In the threaded connection of Japanese Patent No. 4087798, the thread-groove width changes over the entire thread length, where the rate of change in thread-groove width is not constant. Thus, the difference between the minimum thread-groove width and the maximum thread-groove width is large. This means a particularly large number of cutting passes in the pipe-axis direction for the thread groove with the maximum thread-groove width, increasing the machining time for the entire thread. Further, if the thread-ridge width varies along the entire thread length, this necessarily means that the thread-ridge width of the endmost portion is very small. If this thread-ridge width is substantially equal to or smaller than the height of the thread ridge, when a tensile load is applied in the pipe-axis direction, a shear fracture can easily occur at the base of the thread ridge having the smallest thread-ridge width.

An object of the present disclosure is to provide a threaded connection that has high torque and requires reduced machining time for the thread.

A threaded connection for steel pipe according to the present disclosure connects a pair of pipes. The threaded connection includes a pin and a box. The pin has a male thread on its outer diameter. The box has a female thread on its inner diameter, the female thread corresponding to the male thread. The box and the pin are made up. The male thread includes a constant-thread-width portion and a varying-thread-width portion. The constant-thread-width portion of the male thread has a constant thread-groove width. The varying-thread-width portion of the male thread has a thread-groove width equal to the thread-groove width of the constant-thread-width portion of the male thread or larger and gradually increasing going from the constant-thread-width portion of the male thread toward a tip of the pin. The female thread includes a constant-thread-width portion and a varying-thread-width portion. The constant-thread-width portion of the female thread has a constant thread-ridge width. The varying-thread-width portion of the female thread has a thread-ridge width equal to the thread-ridge width of the constant-thread-width portion of the female thread or larger and gradually increasing going from the constant-thread-width portion of the female thread toward a center of the box.

The threaded connection for steel pipe according to the present disclosure reduces the machining time for the thread while providing a threaded connection having high torque.

EMBODIMENTS FOR CARRYING OUT THE INVENTION

A threaded connection according to an embodiment connects a pair of pipes. The threaded connection includes a pin and a box. The pin has a male thread on its outer diameter. The box has a female thread on its inner diameter, the female thread corresponding to the male thread. The box and the pin are made up. The male thread includes a constant-thread-width portion and a varying-thread-width portion. The constant-thread-width portion of the male thread has a constant thread-groove width. The varying-thread-width portion of the male thread has a thread-groove width equal to the thread-groove width of the constant-thread-width portion of the male thread or larger and gradually increasing going from the constant-thread-width portion of the male thread toward a tip of the pin. The female thread includes a constant-thread-width portion and a varying-thread-width portion. The constant-thread-width portion of the female thread has a constant thread-ridge width. The varying-thread-width portion of the female thread has a thread-ridge width equal to the thread-ridge width of the constant-thread-width portion of the female thread or larger and gradually increasing going from the constant-thread-width portion of the female thread toward a center of the box. (first arrangement).

In the first arrangement, the male thread and female thread each include a constant-thread-width portion and a varying-thread-width portion. In the varying-thread-width portion, the thread-groove width and thread-ridge width change; in the constant-thread-width portion, the thread-groove width and thread-ridge width do not change. As the male thread and female thread each include a constant-thread-width portion, the difference between the minimum thread-groove width and the maximum thread-groove width in each of the male thread and female thread is smaller than in implementations where the thread-groove width changes gradually over the entire male and female thread lengths. This reduces the number of cutting passes in the pipe-axis direction for the thread groove having the maximum thread-groove width in each of the male thread and female thread, thereby reducing the total number of cutting passes in the pipe-axis direction. This reduces the machining time for the thread assembly including the male and female threads. Further, as the male thread and female thread each include a constant-thread-width portion, the difference between the minimum thread-ridge width and the maximum thread-ridge width in each of the male thread and female thread is smaller than in implementations where the thread-ridge width changes gradually over the entire male and female thread lengths. This prevents a shear fracture from occurring at the base of the thread ridge having the smallest thread-ridge width in the male or female thread when a tensile load is applied thereto in the pipe-axis direction. Preferably, the minimum thread-ridge width of each of the male thread and female thread is larger than the height of the respective thread ridge.

Further, in the first arrangement, the male thread includes a varying-thread-width portion with varying thread-groove width, and the varying-thread-width portion of the female thread is constructed to correspond to this varying-thread-width portion of the male thread. Thus, the threaded connection having the first arrangement has high torque.

The maximum thread-groove width of each of the male thread and the female thread may be twice the minimum thread-groove width of the corresponding one of the male thread and the female thread or smaller (second arrangement).

For example, in the threaded connection described in Japanese Patent No. 4087798, the thread-groove width changes over the entire thread length and the maximum thread-groove width is three times the minimum thread-groove width or larger, which requires three or more cutting passes for the thread groove. In contrast, in the threaded connection having the above-described second arrangement, the number of cutting passes for the thread groove may be not more than two. This further ensures that the machining time for the thread is reduced.

During screwing of the pin into the box and at the time at which both a stab flank and a load flank of the varying-thread-width portion contact the box, the tip of the pin may not be in contact with a tip of another pin that is made up together with the box, and, after both the stab flank and the load flank of the varying-thread-width portion contact the box and before the male thread yields, the tip of the pin may contact the tip of the other pin (third arrangement).

In the third arrangement, torque may be further increased as necessary.

That is, if the threaded connection is not required to have high-torque performance, during screwing of pins into the box, make-up is completed at the time at which both stab flanks and load flanks of the varying-thread-width portion of the male threads contact the box. At this moment, the tip of a pin that has been screwed into the box is not in contact with the tip of the other pin that is made up together with this box.

On the other hand, if the threaded connection is required to have high-torque performance, the pins are further screwed in, and the tip of one pin is brought into contact with the tip of the other pin before the male threads yield. As the tips of the two pins are in contact with each other, an axial force is applied to each pin, thereby increasing torque.

The pin may further include a shoulder surface. The box may further include a shoulder surface provided to correspond to the shoulder surface of the pin and capable of being in contact with the shoulder surface of the pin when the connection has been made up (fourth arrangement).

In the fourth arrangement, an axial force is applied to the pin when the shoulder surfaces of the pin and box contact each other. This improves torque.

During screwing of the pin into the box and at the time at which both a stab flank and a load flank of the varying-thread-width portion contact the box, the shoulder surface of the pin may not be in contact with the shoulder surface of the box, and, after both the stab flank and the load flank of the varying-thread-width portion contact the box and before the male thread yields, the shoulder surface of the pin may contact the shoulder surface of the box (fifth arrangement).

In the fifth arrangement, too, torque may be increased as necessary.

That is, when the threaded connection is not required to have high-torque performance, during screwing of the pin into the box, make-up is completed at the time at which both stab flanks and load flanks of the varying-thread-width portion of the male thread contact the box. At this moment, the shoulder surfaces of the pin and box are not in contact with each other.

On the other hand, if the threaded connection is required to have high-torque performance, the pin is further screwed in, and the shoulder surfaces of the pin and box are brought into contact before the male thread yields. Thus, an axial force is applied to the pin, thereby increasing torque.

A length of the varying-thread-width portion of the female thread as measured in the pipe-axis direction may be larger than a length of the varying-thread-width portion of the male thread as measured in the pipe-axis direction (sixth arrangement).

In the sixth arrangement, the thread ridges of the male thread can easily fit into the thread grooves of the female thread, facilitating the screw-in of the pin into the box.

Embodiments

Embodiments will now be described with reference to the drawings. The same or corresponding features in the drawings are labeled with the same characters, and their description will not be repeated.

First Embodiment (Overall Construction)

Figure 1:
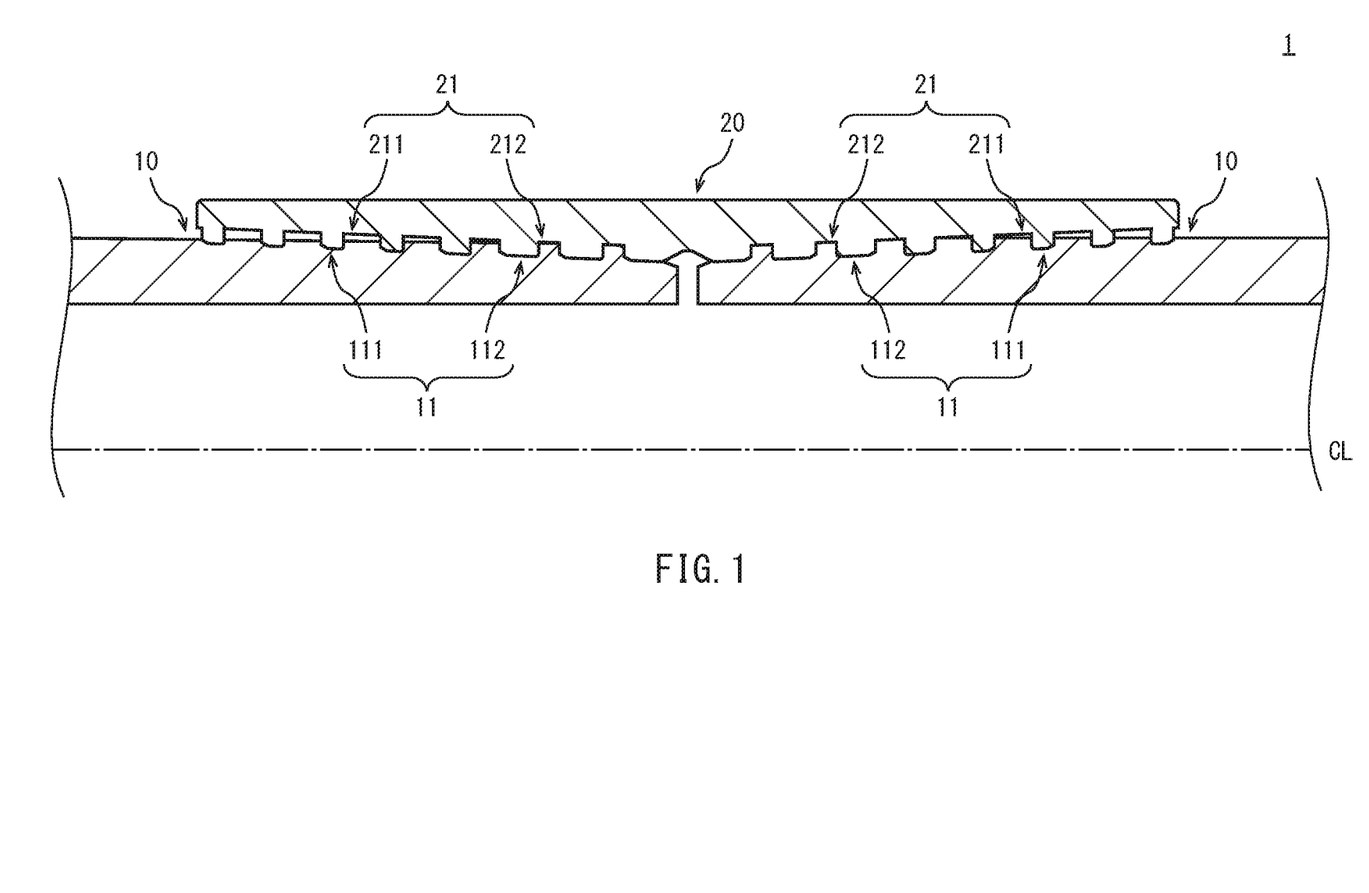
FIG. 1 is a schematic longitudinal cross-sectional view of a threaded connection according to a first embodiment.

FIG. 1 is a longitudinal cross-sectional view of a threaded connection 1 according to a first embodiment. The threaded connection 1 according to the present embodiment is a coupling-type threaded connection. However, the construction of the threaded connection described in connection with the present embodiment may also be applied to an integral-type threaded connection.

As shown in FIG. 1, the threaded connection 1 includes two pins 10 and a box 20. The two pins 10 and box 20 are tubular in shape. The box 20 and each pin 10 are made up. One pin 10 is inserted into one end of the box 20 as determined along the pipe-axis direction, and the other pin 10 is inserted into the other end as determined along the pipe-axis direction.

Each pin 10 has a male thread 11 on its outer periphery. The box 20 has, on its inner periphery, female threads 21 corresponding to the male threads 11. Each male thread 11 and each female thread 21 are constituted by tapered threads capable of engaging each other. The thread shape of the male and female threads 11 and 21 is dove-tailed.

The male thread 11 of each pin 10 includes a constant-thread-width portion 111 and a varying-thread-width portion 112. Each female thread 21 of the box 20 includes a constant-thread-width portion 211 and a varying-thread-width portion 212. In the constant-thread-width portions 111 and 211, the thread-ridge width and the thread-groove width are constant, while in the varying-thread-width portions 112 and 212, the thread-ridge width and the thread-groove width change. This feature will be described in more detail further below.

Figure 2A:
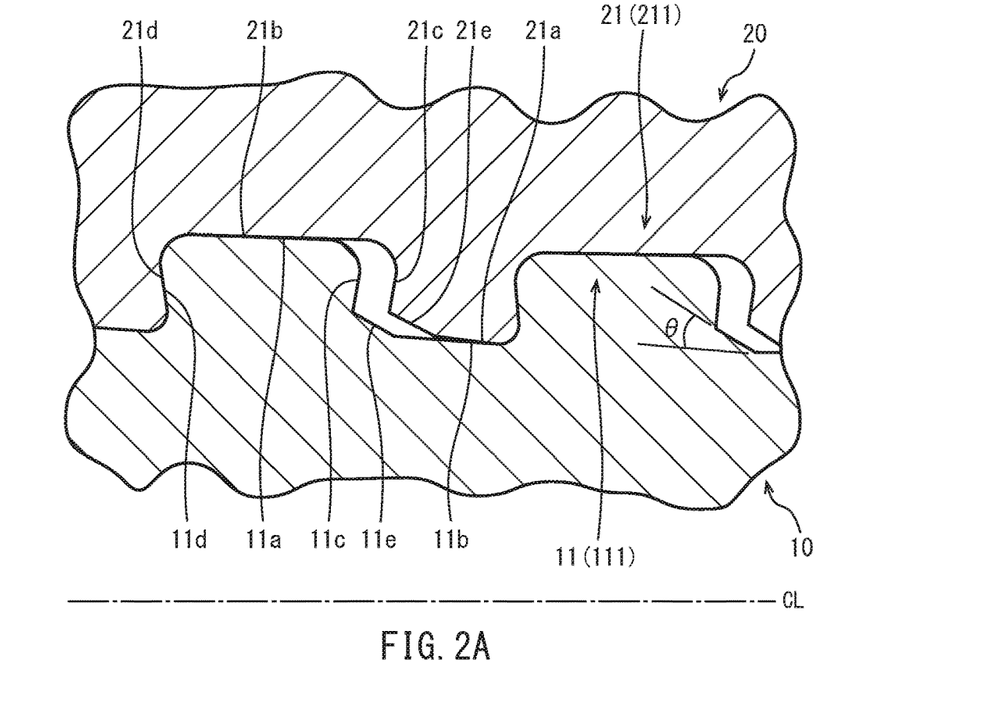
FIG. 2A is an enlarged longitudinal cross-sectional view of the constant-thread-width portion of the threaded connection shown in FIG. 1.
Figure 2B:
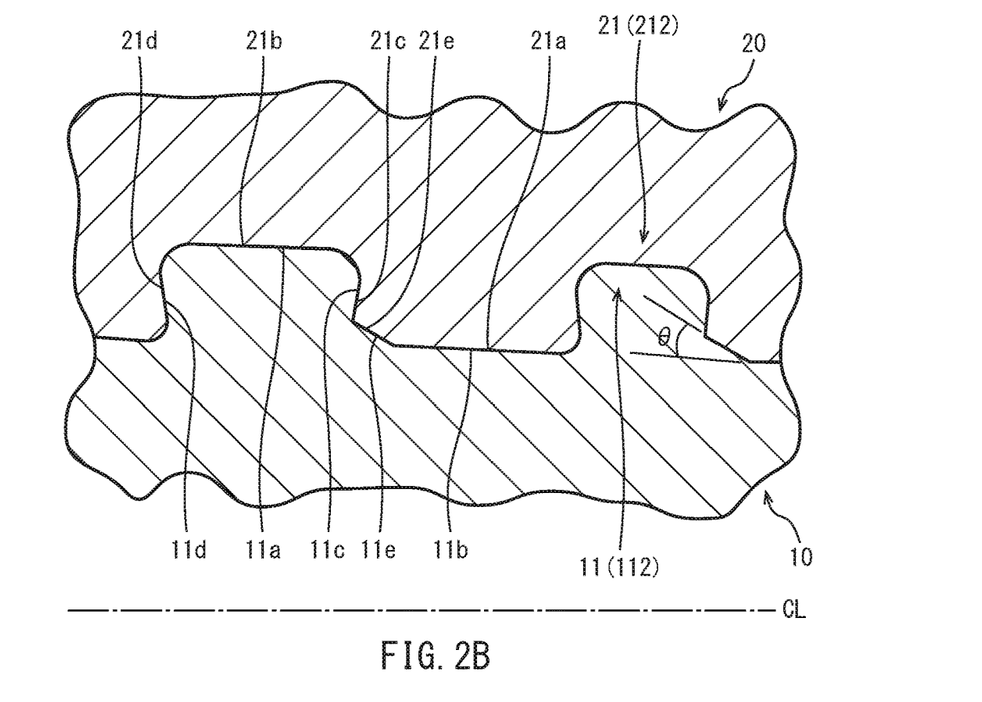
FIG. 2B is an enlarged longitudinal cross-sectional view of the varying-thread-width portion of the threaded connection shown in FIG. 1.

FIG. 2A is an enlarged longitudinal cross-sectional view of the constant-thread-width portions 111 and 211. FIG. 2B is an enlarged longitudinal cross-sectional view of the varying-thread-width portions 112 and 212.

As shown in FIGS. 2A and 2B, in a cross section of the threaded connection 1 that contains the pipe axis CL, each male thread 11 includes a plurality of thread crests 11a, a plurality of thread roots 11b, a plurality of stab flanks 11c and a plurality of load flanks 11d. The stab flanks 11c and the load flanks 11d connect the thread crests 11a and thread roots 11b. A stab flank 11c is a flank that precedes during screwing of the pin 10 into the box 20. A load flank 11d is located opposite to the corresponding stab flank 11c.

In a cross section of the threaded connection 1 containing the pipe axis CL, each female thread 21 includes a plurality of thread crests 21a, a plurality of thread roots 21b, a plurality of stab flanks 21c and a plurality of load flanks 21d. The thread crests 21a face the thread roots 11b of the male thread 11. The thread roots 21b face the thread crests 11a of the male thread 11. The stab flanks 21c face the stab flanks 11c of the male thread 11. The load flanks 21d face the load flanks 11d of the male thread 11.

The flank angles of the stab flanks 11c and 21c and the load flanks 11d and 21d are negative angles smaller than 0°. Flank angle as used herein means the angle formed by a plane perpendicular to the pipe axis CL and the stab flank 11c or 21c or load flank 11d or 21d. In FIGS. 2A and 2B, in connection with the flank angles of the stab flanks 11c and 21c, the counterclockwise direction is the positive direction, and, in connection with the flank angles of the load flanks 11d and 21d, the clockwise direction is the positive direction.

In a cross section of the threaded connection 1 containing the pipe axis CL, the male thread 11 preferably includes a plurality of chamfered surfaces 11e. Each chamfered surface 11e is an inclined surface connecting a stab flank 11c and a thread root 11b. The angle $\theta$ of the chamfered surface 11e relative to the thread root 11b is preferably in the range of 25° to 75°.

If the male thread 11 includes chamfered surfaces 11e, the female thread 21 includes chamfered surfaces 21e corresponding to the chamfered surfaces 11e of the male thread 11. The chamfered surfaces 21e of the female thread 21 face the chamfered surfaces 11e of the male thread 11.

As shown in FIG. 2A, when the connection has been made up, in the constant-thread-width portions 111 and 211, a load flank 11d of the male thread 11 is in contact with a load flank 21d of the female thread 21. Further, in the constant-thread-width portions 111 and 211, a thread crest 11a and a thread root 11b of the male thread 11 are in contact with a thread root 21b and a thread crest 21a, respectively, of the female thread 21. However, in the constant-thread-width portions 111 and 211, stab flanks 11c and 21c are not in contact with each other. If the male and female threads 11 and 21 include chamfered surfaces 11e and 21e, in the constant-thread-width portions 111 and 211, chamfered surfaces 11e and 21e are not in contact with each other, either. That is, in the constant-thread-width portions 111 and 211, a gap is present between the male thread 11 and female thread 21 when the connection has been made up.

On the other hand, as shown in FIG. 2B, in the varying-thread-width portions 112 and 212, no gap is present between the male thread 11 and female thread 21 when the connection has been made up. That is, when the connection has been made up, in the varying-thread-width portions 112 and 212, load flanks 11d and 21d are in contact with each other and stab flanks 11c and 21c are in contact with each other. Further, in the varying-thread-width portions 112 and 212, a thread crest 11a of the male thread 11 is in contact with a thread root 21b of the female thread 21, and a thread root 11b of the male thread 11 is in contact with a thread crest 21a of the female thread 21. If the male and female threads 11 and 12 include chamfered surfaces 11e and 21e, in the varying-thread-width portions 112 and 212, chamfered surfaces 11e and 21e are in contact with each other.

Figure 3:
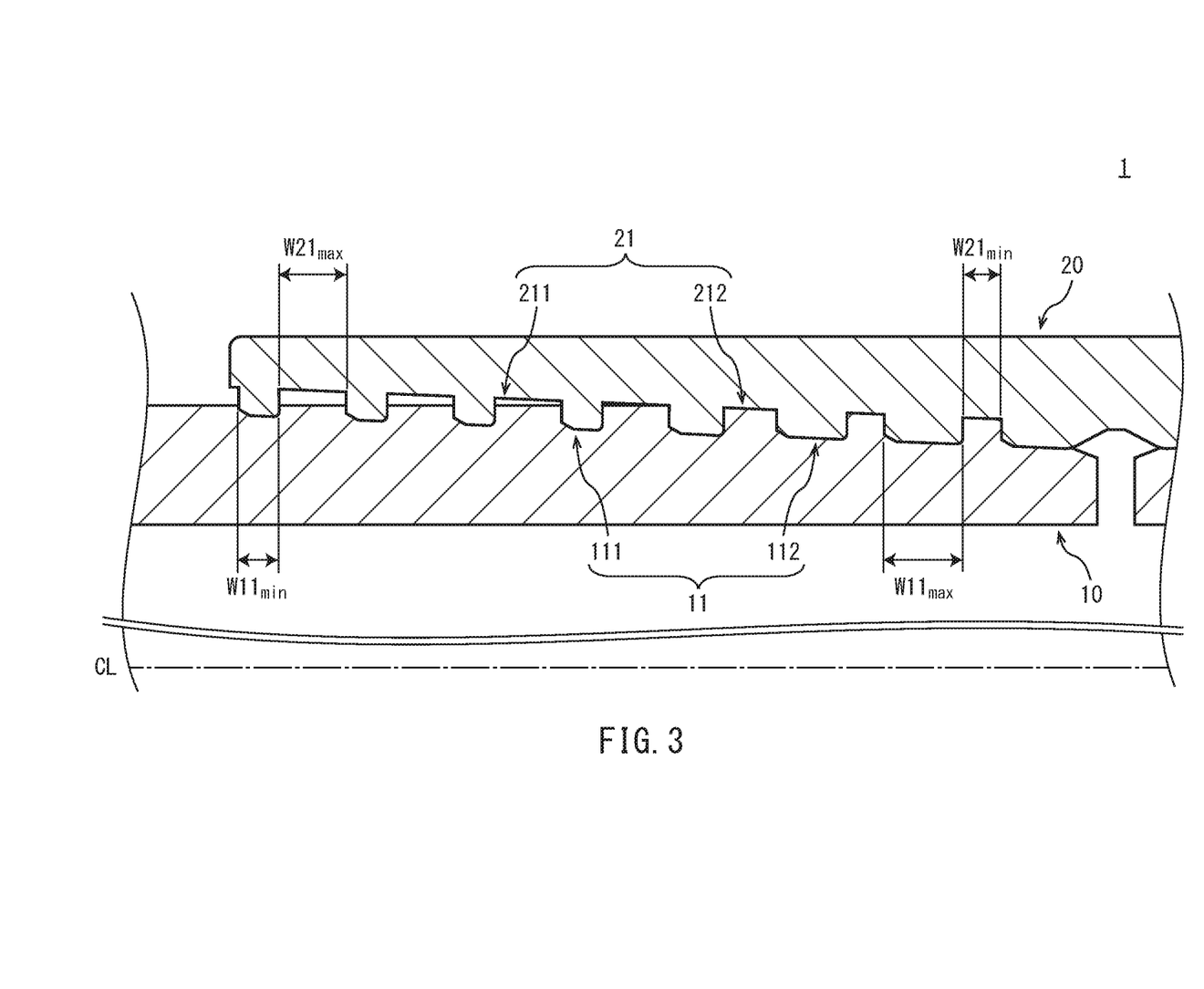
FIG. 3 is an enlarged longitudinal cross-sectional view of part of the threaded connection shown in FIG. 1.

FIG. 3 is an enlarged longitudinal cross-sectional view of part of the threaded connection 1. FIG. 3 shows one of the two pins 10 and the portion of the box 20 that is associated with this one pin 10.

As discussed above, the male thread 11 of the pin 10 includes a constant-thread-width portion 111 and a varying-thread-width portion 112. The constant-thread-width portion 111 of the male thread 11 is located closer to the base of the pin 10 (i.e. pipe body). The constant-thread-width portion 111 has a constant thread-groove width and a constant thread-ridge width.

The varying-thread-width portion 112 of the male thread 11 is located closer to the tip of the pin 10 than the constant-thread-width portion 111 is. The varying-thread-width portion 112 is located adjacent to the constant-thread-width portion 111 to form a continuous portion. The varying-thread-width portion 112 has a thread-groove width equal to or larger than the thread-groove width of the constant-thread-width portion 111. The thread-groove width of the varying-thread-width portion 112 gradually increases, going from the constant-thread-width portion 111 toward the tip of the pin 10. Accordingly, the thread-ridge width of the varying-thread-width portion 112 gradually decreases toward the tip of the pin 10.

In the male thread 11, the maximum thread-groove width $W11_{max}$ is preferably twice the minimum thread-groove width $W11_{min}$ or smaller. The thread-groove width of the varying-thread-width portion 112 changes without becoming below the thread-groove width of the constant-thread-width portion 111. As such, the varying-thread-width portion 112 has the maximum thread-groove width $W11_{max}$ of the male thread 11. Further, the minimum thread-groove width $W11_{min}$ of the male thread 11 is the thread-groove width of the constant-thread-width portion 111.

The female thread 21 of the box 20 includes a constant-thread-width portion 211 and a varying-thread-width portion 212 that correspond to the constant-thread-width portion 111 and varying-thread-width portion 112 of the male thread 11.

The constant-thread-width portion 211 faces the constant-thread-width portion 111 of the male thread 11. The constant-thread-width portion 211 has a constant thread-ridge width and a constant thread-groove width. The thread-ridge width and thread-groove width of the constant-thread-width portion 211 correspond to the thread-groove width and thread-ridge width, respectively, of the constant-thread-width portion 111 of the made thread 11.

The varying-thread-width portion 212 faces the varying-thread-width portion 112 of the male thread 11. The thread-ridge width and thread-groove width of the varying-thread-width portion 212 correspond to the thread-groove width and thread-ridge width, respectively, of the varying-thread-width portion 112 of the male thread 11. That is, the thread-ridge width of the varying-thread-width portion 212 gradually increases, going from the constant-thread-width portion 211 toward the center of the box 20 (i.e. in the direction opposite to that toward the tip of the box 20), to correspond to the thread-groove width of the varying-thread-width portion 112 of the male thread 11. The thread-groove width of the varying-thread-width portion 212 gradually decreases, going from the constant-thread-width portion 211 toward the center of the box 20, to correspond to the thread-ridge width of the varying-thread-width portion 112 of the male thread 11.

In the female thread 21, the maximum thread-groove width $W21_{max}$ is preferably twice the minimum thread-groove width $W21_{min}$ or smaller. The thread-groove width of the varying-thread-width portion 212 changes without becoming above the thread-groove width of the constant-thread-width portion 211. As such, the varying-thread-width portion 212 has the minimum thread-groove width $W21_{min}$ of the female thread 21. Further, the maximum thread-groove width $W21_{max}$ of the female thread 21 is the thread-groove width of the constant-thread-width portion 211.

In the male and female threads 11 and 21, mainly the varying-thread-width portions 112 and 212 contribute to the improvement of torque. The proportion of the entire male thread portion 11 represented by the varying-thread-width portion 112 may be decided as appropriate, taking account of the required torque. Similarly, the proportion of the entire female thread 21 represented by the varying-thread-width portion 212 may be decided as appropriate, taking account of the required torque. For example, $0<L_{112}/L_{11}<1$, where $L_{11}$ is the length of the entire male thread 11 as measured in the pipe-axis direction and $L_{112}$ is the length of the varying-thread-width portion 112 as measured in the pipe-axis direction. Preferably, $0.3<L_{112}/L_{11}<1.0$. Further, $0<L_{212}/L_{21}<1$, where $L_{21}$ is the length of the entire female thread 21 as measured in the pipe-axis direction and $L_{212}$ is the length of the varying-thread-width portion 212 as measured in the pipe-axis direction. Preferably, $0.2<L_{212}/L_{21}<0.9$.

Figure 4A:
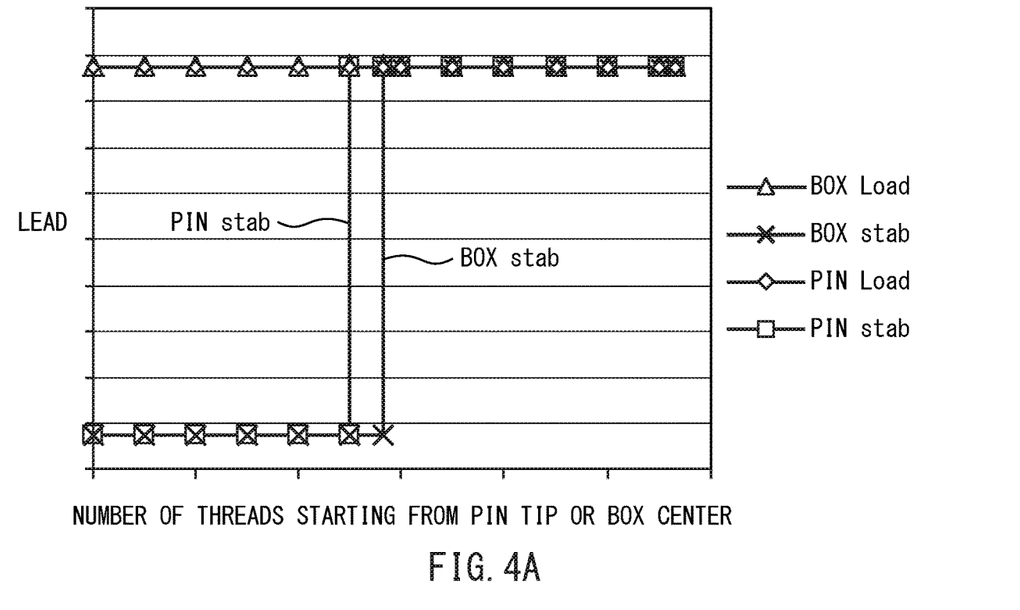
FIG. 4A is a graph showing the stab lead and load lead of the threaded connection shown in FIG. 1.

FIG. 4A is a graph showing the stab lead and load lead of the pin and box. In the graph shown in FIG. 4A, the vertical axis represents the magnitude of lead while the horizontal axis represents the number of thread ridges as counted from the tip of the pin or the center of the box.

Figure 4B:
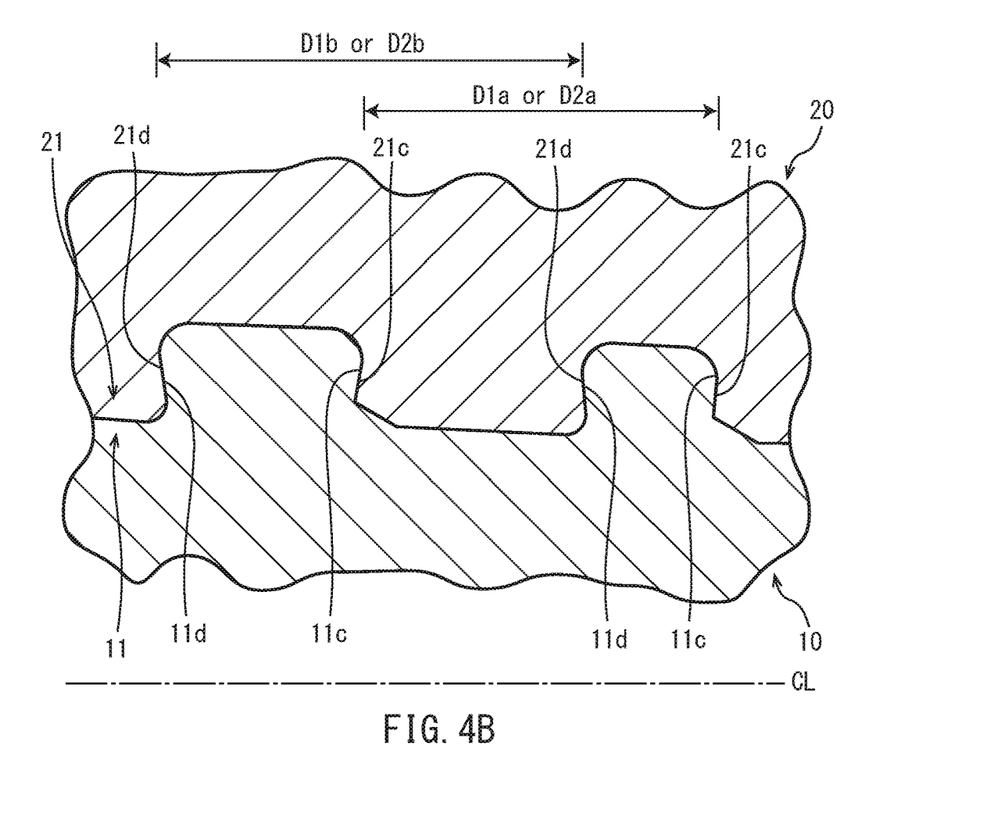
FIG. 4B is an enlarged longitudinal cross-sectional view of the thread of the threaded connection shown in FIG. 1.

The stab lead and load lead of the pin and box will be described with reference to FIG. 4B. The stab lead of the pin is the distance D1a between adjacent stab flanks 11c of the male thread 11 as measured in the pipe-axis direction. The load lead of the pin is the distance D1b between adjacent load flanks 11d of the male thread 11 as measured in the pipe-axis direction. The stab lead of the box is the distance D2a between adjacent stab flanks 21c of the female thread 21 as measured in the pipe-axis direction. The load lead of the box is the distance D2b between adjacent load flanks 21d of the female thread 21 as measured in the pipe-axis direction.

How the stab lead and load lead change will be described with reference to FIG. 4A. As shown in FIG. 4A, in the tip portion of the pin, i.e. varying-thread-width portion 112 (FIG. 3) of the male thread 11, the load lead is larger than the stab lead. Similarly, in the central portion of the box, i.e. varying-thread-width portion 212 (FIG. 3) of the female thread 21, the load lead is larger than the stab lead.

In the base portion of the pin, i.e. constant-thread-width portion 111 (FIG. 3) of the male thread 11, the stab lead is equal to the load lead. Similarly, in the end portion of the box 20, i.e. constant-thread-width portion 211 (FIG. 3) of the female thread 21, the stab lead is equal to the load lead.

The load leads of the pin and box are constant over the entire thread length. On the other hand, the stab leads of both the pin and box change. That is, in each of the pin and box, the stab lead increases at the switch from the varying-thread-width portion to the constant-thread-width portion.

As will be apparent from FIG. 4A, the length of the varying-thread-width portion of the female thread as measured in the pipe-axis direction, $L_{212}$, is larger than the length of the varying-thread-width portion of the male thread as measured in the pipe-axis direction, $L_{112}$. That is, the position of the switch in the pin from the varying-threadwidth portion to the constant-thread-width portion is not exactly the same as the position of the switch in the box from the varying-thread-width portion to the constant-thread-width portion. More specifically, $L_{212}/L_{112}>1.05$. This is because, if these positions in the pin and box were exactly the same, thread ridges of the male thread could not easily fit into thread grooves of the female thread, which would make it difficult to screw the pin into the box.

(Method of Making Up Pin and Box)

The method of making up the pin 10 and box 20 will be described below.

As discussed above, the threaded connection 1 according to the present embodiment is a coupling-type threaded connection. Accordingly, pins 10 are screwed into the ends of the box 20 as determined along the pipe-axis direction.

Referring to FIGS. 1 and 2B, when one pin 10 is screwed into one end of the box 20 as determined along the pipe-axis direction, the male thread 11 of the pin 10 and the female thread 21 of the box 20 interfere with each other and, at some time point, load flanks 11d and stab flanks 11c of the varying-thread-width portion 112 of the male thread 11 contact the box 20. More specifically, load flanks 11d and stab flanks 11c of the varying-thread-width portion 112 contact load flanks 21d and stab flanks 21c of the associated female thread 21. Similarly, when the other pin 10 is screwed into the other end of the box 20 as determined along the pipe-axis direction, at some time point, load flanks 11d and stab flanks 11c of the varying-thread-width portion 112 of the male thread 11 of this other pin 10 contact load flanks 21d and stab flanks 21c of the associated female thread 21 (FIG. 2B). At this moment, the tips of the pins 10 are not in contact with each other, as shown in FIG. 1.

Figure 5:
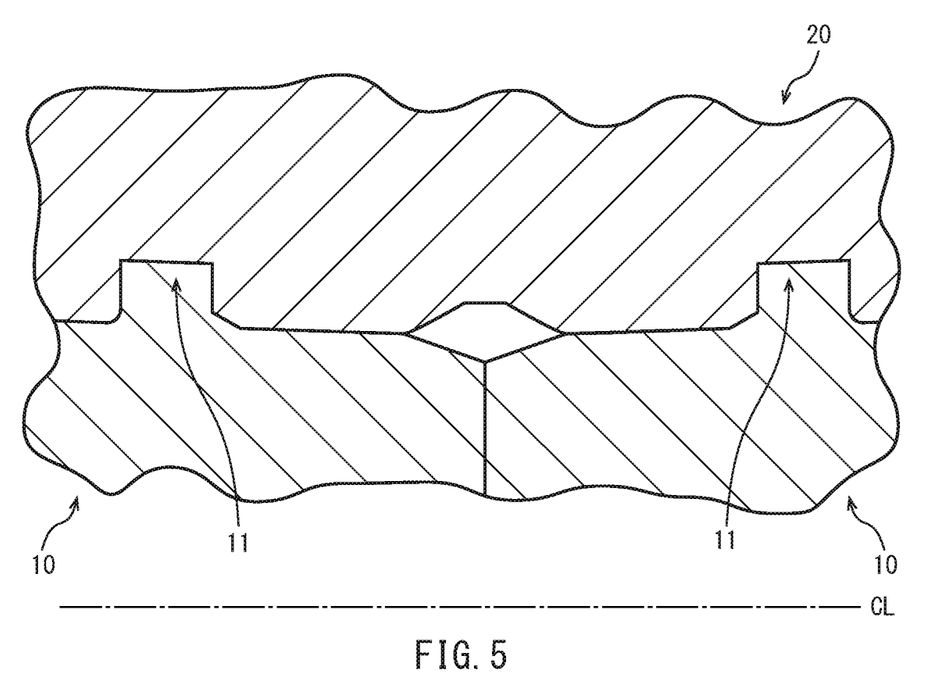
FIG. 5 is a longitudinal cross-sectional view of the threaded connection according to the first embodiment, showing how the tips of the pins are in contact with each other.

For example, if the threaded connection 1 is used for horizontal digging in a shale well, for example, the threaded connection 1 is required to have high-torque performance. In this case, starting with the state shown in FIG. 1, the pins 10 are suitably screwed farther into the box 20. That is, when load flanks 11d and stab flanks 11c of the varying-thread-width portion 112 contact the box 20 (FIG. 2B) and then the pins 10 are further screwed into the box 20, the tips of the pins 10 contact each other, as shown in FIG. 5. The tips of the pins 10 contact each other before the male threads 11 yield. Thus, an axial force is applied to each pin 10, thereby increasing torque. To ensure that an axial force is applied to each pin 10, the tip of each pin 10 is preferably constituted by an annular surface that is substantially perpendicular to the pipe axis CL.

Effect of First Embodiment

As discussed above, in a threaded connection 1 according to the present embodiment, the male thread 11 includes a constant-thread-width portion 111 and a varying-thread-width portion 112. The thread-groove width of the varying-thread-width portion 112 increases, going from the constant-thread-width portion 111 toward the tip of the pin 10; on the other hand, the thread-groove width of the constant-thread-width portion 111 does not change. As the male thread 11 includes this constant-thread-width portion 111, the difference in the thread-groove width in the male thread 11 is smaller than in implementations where the thread-groove width changes gradually over the entire male thread length. This will reduce the number of cutting passes in the pipe-axis direction during machining to create the male thread 11 using a cutting tool with a size corresponding with the minimum thread-groove width.

The female thread 21 is provided to correspond to the male thread 11. That is, the female thread 21 has a constant-thread-width portion 211 that corresponds to the constant-thread-width portion 111 of the male thread 11. This will reduce the difference in the thread-groove width with in the female thread 21, too, thereby reducing the number of cutting passes in the pipe-axis direction.

Thus, the threaded connection 1 according to the present embodiment will reduce the number of cutting passes in the pipe-axis direction for the male and female threads 11 and 21. This will reduce the machining time for the thread assembly composed of the male and female threads 11 and 21.

Further, each of the male thread 11 and female thread 21 includes a constant-thread-width portions 111 and 211 and a varying-thread-width portions 112 and 212. As these constant-thread-width portions 111 and 211 are provided on each of the male thread 11 and female thread 21, the difference between the minimum thread-ridge width and the maximum thread-ridge width in each of the male thread 11 and female thread is smaller than in implementations where the thread-ridge width changes gradually over the entire male and female thread 11, 12 lengths. This prevents a shear fracture from occurring at the base of the thread ridge having the smallest thread-ridge width in either of the male and female threads when a tensile load is applied thereto in the pipe-axis direction.

As discussed above, the male thread 11 includes a varying-thread-width portion 112 having a thread-groove width increasing toward the tip of the pin 10. The female thread includes a varying-thread-width portion 212 having a thread-groove width changing so as to correspond to the varying-thread-width portion 112 of the male thread 11. Thus, the threaded connection 1 according to the present embodiment also has high torque.

If it is intended only to reduce the difference between the maximum thread-groove width and the minimum thread groove width of the male thread and the difference between the maximum thread groove width and the minimum thread groove width of the female thread, it is possible to provide an implementation having a varying-thread-width portion with a small rate of change in each of the thread-groove width and thread-ridge width over the entire male or female thread length, and having no constant-thread-width portion. However, an implementation where each of the male and female threads includes varying-thread-width portions 112 and 212 with large rates of change in the thread-groove width and thread-ridge width and includes constant-thread-width portions 111 and 211 is more advantageous, since it provides higher torque.

The maximum thread-groove width $W11_{max}$ of the male thread 11 is preferably twice the minimum thread-groove width $W11_{min}$ or smaller. Thus, the number of cutting passes for the thread grooves of the male thread 11 can be two or smaller. The maximum thread-groove width $W21_{max}$ of the female thread 21 is preferably twice the minimum thread-groove width $W21_{min}$ or smaller. Thus, the number of cutting passes for the thread grooves of the female thread 21 can be two or smaller.

It is preferable that the minimum thread-ridge width of each of the male and female threads 11 and 21 is larger than the height of the thread ridges to prevent a shear fracture from occurring at the base of a thread ridge when a tensile load is applied thereto in the pipe-axis direction.

During screwing of the pins 10 into the box 20, at the time at which both stab flanks and load flanks of the varying-thread-width portions 112 contact the box 20, the tips of the pins 10 are not in contact with each other. When quite high-torque performance is not particularly required, the threaded connection 1 is used where the tips of the pins 10 are not in contact with each other.

When the threaded connection 1 is required to have quite high-torque performance, the pins 10 may further be screwed into the box 20 to allow the tips of the pins 10 to contact each other before the male threads 11 yield. Thus, an axial force is applied to each pin 10, thereby increasing torque. Thus, the threaded connection 1 according to the present embodiment will increase torque as necessary.

In the threaded connection 1 according to the present embodiment, the male thread 11 and female thread 21 include not only constant-thread-width portions 111 and 211 but also varying-thread-width portions 112 and 212. This will ensure that the required torque is provided.

Once a connection has been made up, when thread roots of the male thread are in contact with thread crests of the female thread and thread crests of the male thread are not in contact with thread roots of the female thread, then, the thread assembly composed of the male and female threads has no sealing performance. On the other hand, when the threaded connection 1 according to the present embodiment has been made up, thread roots 11b of the male thread 11 and thread crests 21a of the female thread 21 in the varying-thread-width portions 112 and 212 are in contact with each other, and thread crests 11a of the male thread 11 and thread roots 21b of the female thread 21 are in contact with each other. This construction will give sealing performance to the thread assembly composed of the male and female threads 11 and 21.

Second Embodiment

Figure 6:
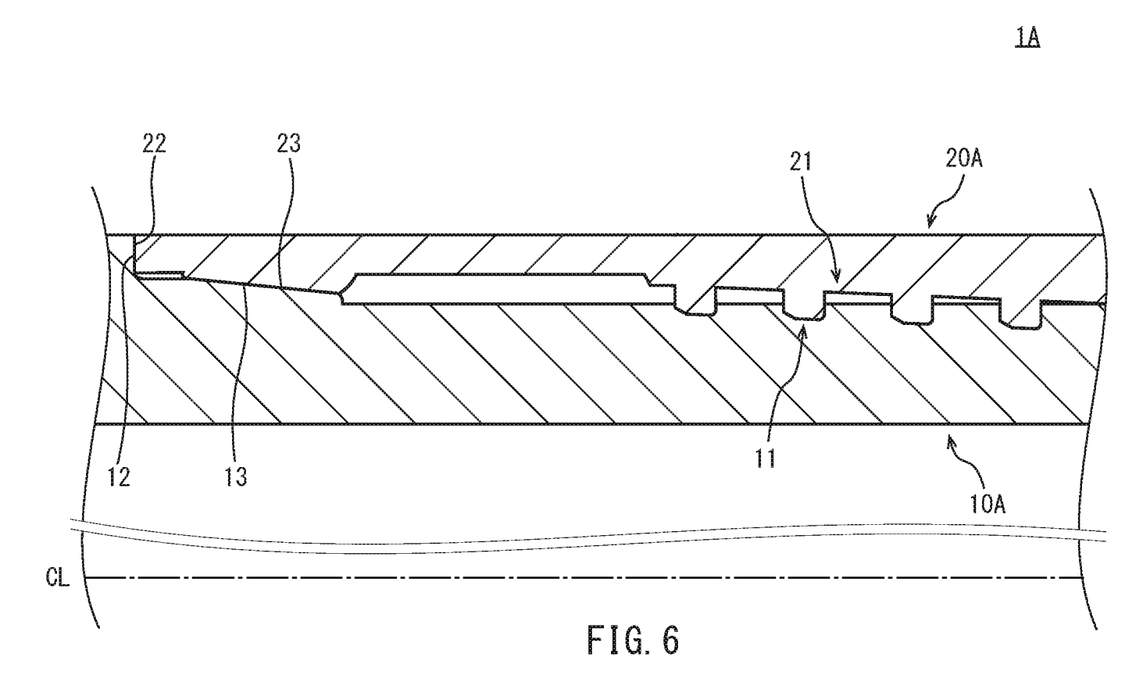
FIG. 6 is a schematic longitudinal cross-sectional view of a threaded connection according to a second embodiment.

FIG. 6 is a longitudinal cross-sectional view of a threaded connection 1A according to a second embodiment. The threaded connection 1A is different from the threaded connection 1 according to the first embodiment in that the pin 10A and box 20A include shoulder surfaces 12 and 22 and sealing surfaces 13 and 23. The other features of the threaded connection 1A may be the same as those of the threaded connection 1 according to the first embodiment.

The pin 10A includes a shoulder surface 12 and a sealing surface 13. The shoulder surface 12 is located on the base end of the pin 10A. The shoulder surface 12 may be an annular surface substantially perpendicular to the pipe axis CL. The sealing surface 13 is provided on the outer periphery of the pin 10A. The sealing surface 13 on the pin 10A is located between the male thread 11 and shoulder surface 12.

The box 20A includes a shoulder surface 22 and a sealing surface 23. The shoulder surface 22 is provided to correspond to the shoulder surface 12 of the pin 10A. The shoulder surface 22 may be an annular surface substantially perpendicular to the pipe axis CL. The sealing surface 23 is provided on the inner periphery of the box 20A to correspond to the sealing surface 13 of the pin 10A. The sealing surface 23 is located between the female thread 21 and shoulder surface 22.

The sealing surfaces 13 and 23 contact each other as the pin 10A is screwed into the box 20A and, when the connection has been made up, are in fitting adhesion to achieve an interference fit. Thus, the sealing surfaces 13 and 23 form a seal assembly via metal-to-metal contact. This improves the sealing performance of the threaded connection 1A. The seal assembly composed of the sealing surfaces 13 and 23 exhibits particularly good sealing performance against the external pressure.

As the pin 10A is screwed into the box 20A, the shoulder surfaces 12 and 22 contact each other and are pressed against each other. As the shoulder surfaces 12 and 22 contact each other, an axial force is applied to the pin 10A, thereby increasing torque.

Although not shown, the male thread 11 of the pin 10A has a varying-thread-width portion similar to that of the present embodiment. During screwing of the pin 10A into the box 20A, the shoulder surfaces 12 and 22 may contact each other at the time point at which load flanks and stab flanks of the varying-thread-width portion of the male thread 11 contact the box 20A, or may not be in contact with each other at this time point.

If the shoulder surfaces 12 and 22 are not in contact with each other at the time at which load flanks and stab flanks of the varying-thread-width portion of the male thread 11 contact the box 20A, further screwing the pin 10A into the box 20A can bring the shoulder surfaces 12 and 22 into contact. That is, after load flanks and stab flanks of the varying-thread-width portion of the male thread 11 contact the box 20A, the pin 10A is further screwed into the box 20A to bring the shoulder surfaces 12 and 22 into contact before the male thread 11 yields. Thus, an axial force is applied to the pin 10A such that torque is higher than when the shoulder surfaces 12 and 22 do not contact each other. This construction will, similar to the first embodiment, increase torque as necessary.

According to the second embodiment, the pin 10A includes a shoulder surface 12 and a sealing surface 13; alternatively, the pin 10A may only include one of the shoulder surface 12 and sealing surface 13. In such implementations, the box 20A includes a shoulder surface 22 corresponding to the shoulder surface 12 of the pin 10A or a sealing surface 23 corresponding to the sealing surface 13 of the pin 10A.

Third Embodiment

Figure 7:
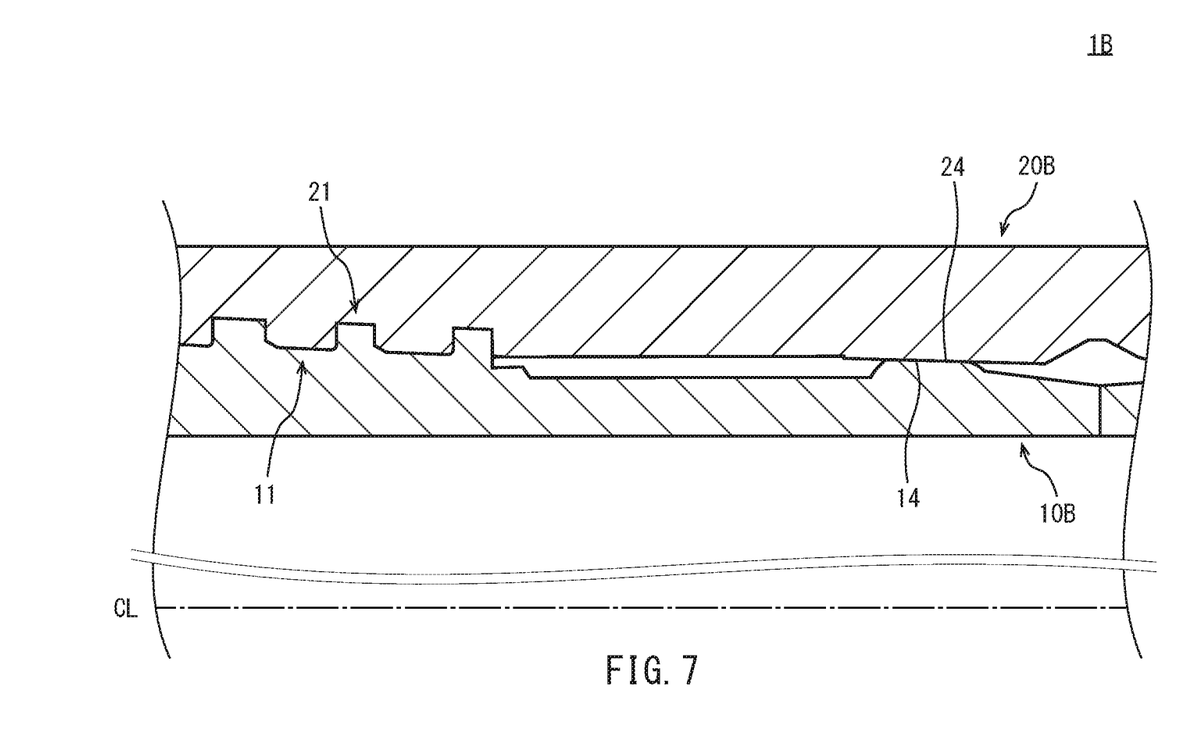
FIG. 7 is a schematic longitudinal cross-sectional view of a threaded connection according to a third embodiment.

FIG. 7 is a longitudinal cross-sectional view of a threaded connection 1B according to a third embodiment. The threaded connection 1B is different from the threaded connection 1 according to the first embodiment in that the pin 10B and box 20B include sealing surfaces 14 and 24. The other features of the threaded connection 1B may be the same as those of the threaded connection 1 according to the present embodiment.

The pin 10B includes a sealing surface 14. The sealing surface 14 is provided on the outer periphery of the pin 10B. The sealing surface 14 is located on a tip portion of the pin 10B.

The box 20B includes a sealing surface 24. The sealing surface 24 is provided on the inner periphery of the box 20B to correspond to the sealing surface 14 of the pin 10B.

As the pin 10B is screwed into the box 20B, the sealing surfaces 14 and 24 contact each other and, when the connection has been made up, are in fitting adhesion to achieve an interference fit. Thus, the sealing surfaces 14 and 24 form a seal assembly via metal-to-metal contact. This improves the sealing performance of the threaded connection 1B. The seal assembly composed of the sealing surfaces 14 and 24 exhibits particularly good sealing performance against the internal pressure.

In the threaded connection 1B according to the third embodiment, the pin 10B may further include a sealing surface 13 (FIG. 6) similar to that of the second embodiment. In such implementations, the box 20B includes a sealing surface 23 (FIG. 6) corresponding to the sealing surface 13. This construction will improve the sealing performance against the internal pressure by means of the seal assembly composed of the sealing surfaces 14 and 24 and, at the same time, improve the sealing performance against the external pressure by means of the seal assembly composed of the sealing surfaces 13 and 23.

Fourth Embodiment

Figure 8:
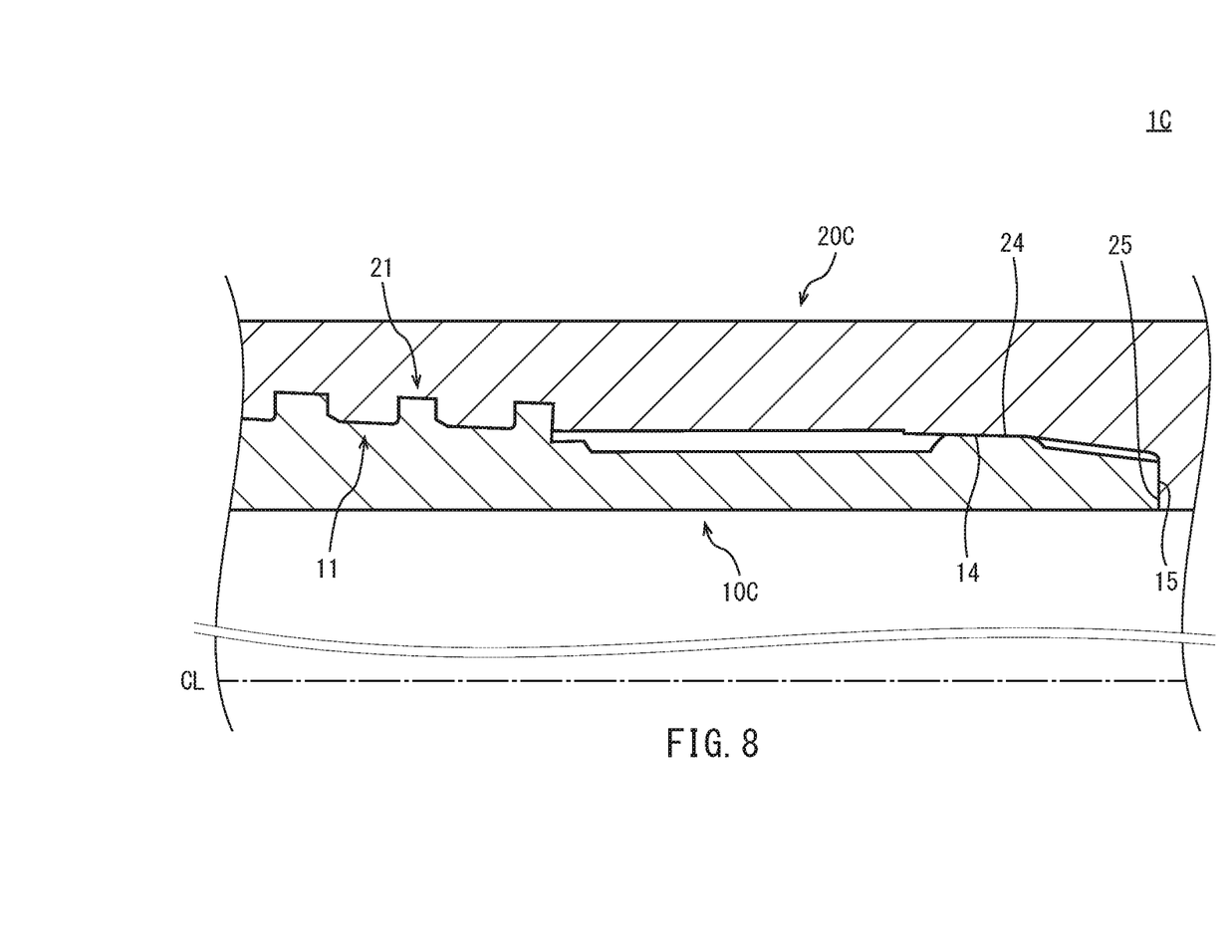
FIG. 8 is a schematic longitudinal cross-sectional view of a threaded connection according to a fourth embodiment.

FIG. 8 is a longitudinal cross-sectional view of a threaded connection 1C according to a fourth embodiment. In the threaded connection 1C, the pin 10C and box 20C include sealing surfaces 14 and 24, respectively, similar to those of the third embodiment. Further, the pin 10C and box 20C include shoulder surfaces 15 and 25, respectively.

The shoulder surface 15 is provided on the tip of the pin 10C. The shoulder surface 25 is provided on the box 20C to correspond to the shoulder surface 15 of the pin 10C. Each of the shoulder surfaces 15 and 25 is preferably constituted by an annular surface substantially perpendicular to the pipe axis CL.

As the pin 10C is screwed into the box 20C, the shoulder surfaces 15 and 25 contact each other and are pressed against each other. As the shoulder surfaces 15 and 25 contact each other, an axial force is applied to the pin 10C, thereby increasing torque.

The male thread 11 of the pin 10C has a varying-thread-width portion similar to that of the first embodiment. As the pin 10C is screwed into the box 20C, the shoulder surfaces 15 and 25 may contact each other at the time point at which load flanks and stab flanks of the varying-thread-width portion of the male thread 11 contact the box 20C, or may not be in contact with each other at this time point.

If the shoulder surfaces 15 and 25 are not in contact with each other at the time at which load flanks and stab flanks of the varying-thread-width portion of the male thread 11 contact the box 20C, further screwing the pin 10C into the box 20C may bring the shoulder surfaces 15 and 25 into contact. That is, after load flanks and stab flanks of the varying-thread-width portion of the male thread 11 contact the box 20C, the pin 10C is further screwed into the box 20C to bring the shoulder surfaces 15 and 25 into contact before the male thread 11 yields. Thus, an axial force is applied to the pin 10C such that torque is higher than when the shoulder surfaces 15 and 25 are not in contact with each other. This construction will, similar to the first embodiment, increase torque as necessary.

According to the fourth embodiment, the pin 10C includes a shoulder surface 15 and a sealing surface 14; alternatively, the pin 10C may include only one of the shoulder surface 15 and sealing surface 14. In such implementations, the box 20C includes a shoulder surface 25 corresponding to the shoulder surface 15 of the pin 10C or a sealing surface 24 corresponding to the sealing surface 14 of the pin 10C.

The pin 10C may further include a shoulder surface 12 similar to that of the second embodiment. That is, the pin 10C may include shoulder surfaces 12 and 15 on the base end and the tip. In such implementations, the box 20C includes shoulder surfaces 22 and 25 corresponding to the shoulder surfaces 12 and 15 of the pin 10C.

[Variations]

Although embodiments have been described, the present invention is not limited to the above-described embodiments, and various modifications are possible without departing from the spirit of the invention.

According to the above-described embodiments, each of the male and female threads includes one constant-thread-width portion and one varying-thread-width portion. Alternatively, each of the male and female threads may include a plurality of constant-thread-width portions and/or a plurality of varying-thread-width portions. In implementations where each of the male and female threads includes a plurality of constant-thread-width portions, the constant-thread-width portions may have different thread-groove widths. In implementations where each of the male and female threads includes a plurality of varying-thread-width portions, the thread-groove widths of the varying-thread-width portions may change at the same rate or at different change rates.

According to the above-described embodiments, the male and female threads are constituted by dove-tailed threads. However, the male and female threads are not limited to this shape. The male and female threads may be constituted by trapezoidal threads, for example.

According to the above-described embodiments, the male and female threads are constituted by single-stage threads; alternatively, they may be constituted by multi-stage threads. The male and female threads may be constituted by single-start threads or double-start threads.

According to the second and fourth embodiments, the pin includes a shoulder surface(s) on the tip and/or base end. In addition, the pin may also include an intermediate shoulder surface provided at an intermediate position. The box includes an intermediate shoulder surface corresponding to the intermediate shoulder surface of the pin. Each of the pin and box may include two or more intermediate shoulder surfaces. In such implementations, each of the male and female threads is constituted by a plurality of thread stages, an intermediate shoulder surface being provided in between.

According to the thread embodiment (FIG. 7), a male sealing surface 14 is located on the tip of the pin, while a female sealing surface 24 is located on the corresponding portion of the box. Alternatively, or additionally, a male sealing surface may be provided on the tip of one pin and a female sealing surface may be provided on the tip of the other pin. As such, the sealing surfaces of both pins form a seal assembly via metal-to-metal contact. This improves the sealing performance of the threaded connection.

Examples

The following tests were conducted to verify the effects of the threaded connection according to the present disclosure.

Inventive Examples

Figure 9:
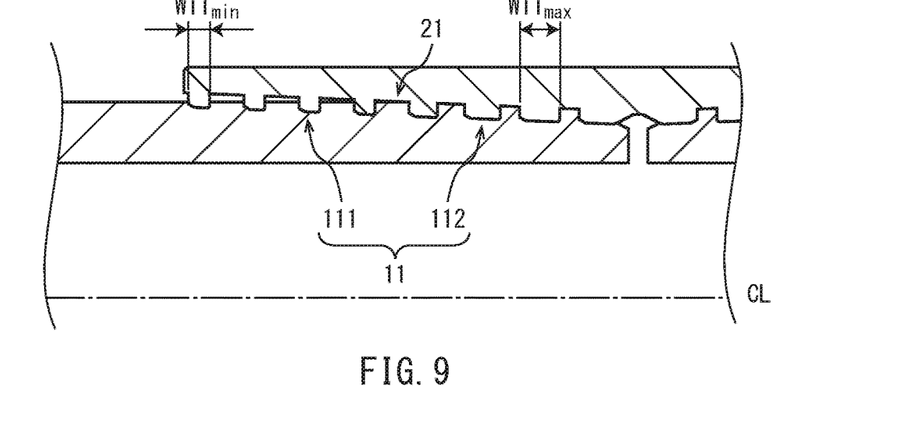
FIG. 9 is a schematic longitudinal cross-sectional view of a threaded connection of an inventive example.

FIG. 9 is a longitudinal cross-sectional view of a threaded connection of an inventive example. Machining was performed to fabricate the male thread 11 of the threaded connection shown in FIG. 9, and the machining time was measured.

A constant-thread-width portion 111 with a constant thread-groove width and a varying-thread-width portion 112 with a thread-groove width that gradually increases going from the constant-thread-width portion 111 toward the tip of the pin 10 were fabricated. The constant-thread-width portion 111 and the varying-thread-width portion 112 had the same length as measured in the pipe-axis direction. That is, a half of the male thread 11 was the constant-thread-width portion 111. As a result, in the male thread 11, the maximum thread-groove width $W11_{max}$ was twice the minimum thread-groove width $W11_{min}$.

Machining for creating the male thread 11 was performed using a cutting tool with a size corresponding with the minimum thread-groove width $W11_{min}$. As discussed above, in the male thread 11, the maximum thread-groove width $W11_{max}$ was twice the minimum thread-groove width $W11_{min}$. Consequently, when the number of cutting passes in the pipe-axis direction for the thread groove having the minimum thread-groove width $W11_{min}$ is represented as 1, the number of cutting passes in the pipe-axis direction for the thread groove having the maximum thread-groove width $W11_{max}$ (i.e. maximum number of cutting passes) was two. The total number of cutting passes in the pipe-axis direction was 14.

Comparative Example

Figure 10:
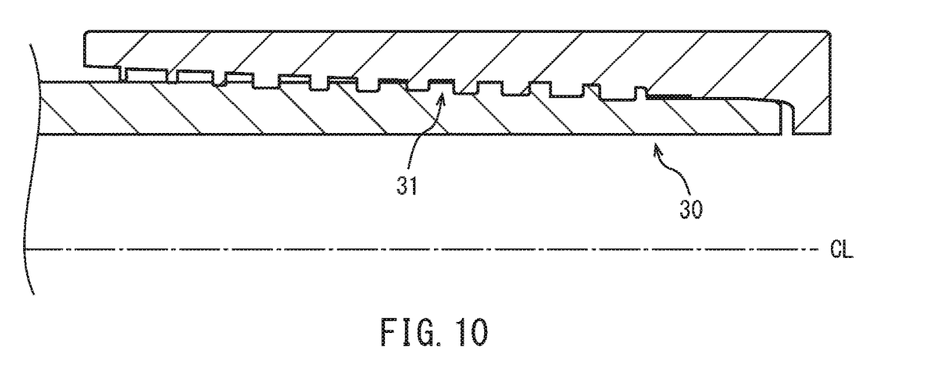
FIG. 10 is a schematic longitudinal cross-sectional view of a threaded connection of a comparative example.

FIG. 10 is a longitudinal cross-sectional view of a threaded connection of a comparative example. Machining was performed to fabricate the male thread 31 of the threaded connection shown in FIG. 10, and the machining time was measured.

In the threaded connection of the comparative example, the thread-groove width was changed over the entire male thread 31. The thread-groove width of the male thread 31 gradually increased, going from the base end of the pin 30 toward the tip thereof. The length of the male thread 31 as measured in the pipe-axis direction was substantially equal to the length, as measured in the pipe-axis direction, of the male thread 11 of the inventive example. The thread-groove width of the male thread 31 changed at substantially the same rate as the thread-groove width of the varying-thread-width portion 112 of the inventive example. As a result, in the male thread 31, the maximum thread-groove width was four times the minimum thread-groove width.

Machining for producing the male thread 31 was performed using a cutting tool with a size corresponding with the minimum thread-groove width. In the male thread 31, the maximum thread-groove width was four times the minimum thread-groove width and thus the maximum number of cutting passes was four. The total number of cutting passes in the pipe-axis direction was 28.

(Evaluation)

Figure 11:
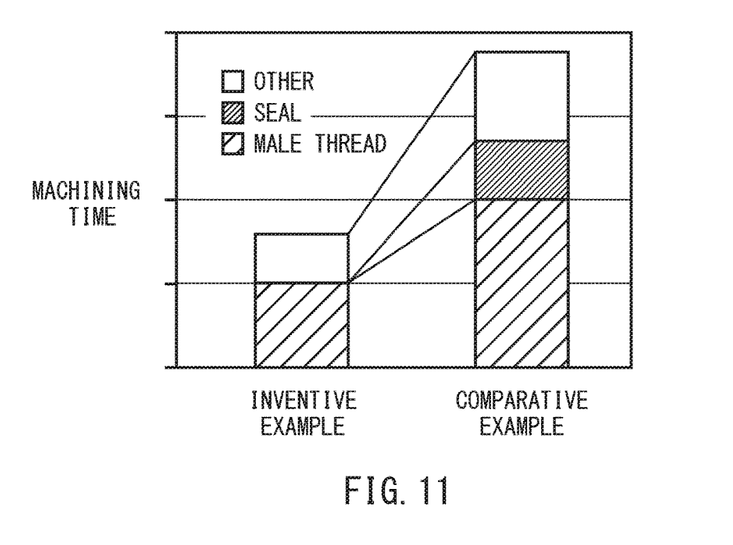
FIG. 11 is a graph of the machining times for the threaded connections of the inventive example and comparative example.

FIG. 11 shows a graph of the machining time for each of the threaded connections of the inventive and comparative examples. The maximum number of cutting passes and the total number of cutting passes for the male thread 11 of the inventive example were half the maximum number of cutting passes and the total number of cutting passes for the male thread 31 of the comparative example. Consequently, as shown in FIG. 11, the machining time for the male thread 11 of the inventive example was about half the machining time for the male thread 31 of the comparative example.

Thus, it was verified that providing a constant-thread-width portion 111 on the male thread 11 reduces the machining time for the male thread 11 compared with the male thread 31 without a constant-thread-width portion. The same effect is expected from the female thread 21 having a construction corresponding to that of the male thread 11.

INDUSTRIAL APPLICABILITY

The present invention is useful in a threaded connection.

The invention claimed is:

1. A threaded connection for connecting a pair of pipes, comprising:

a pin having a male thread on its outer diameter; and a box having a female thread on its inner diameter, the female thread corresponding to the male thread, the box and the pin capable of being made up, wherein the male thread includes:

a constant-thread-width portion having a constant thread-groove width; and a varying-thread-width portion having a thread-groove width equal to the thread-groove width of the constant-thread-width portion of the male thread or larger and gradually increasing going from the constant-thread-width portion of the male thread toward a tip of the pin, wherein the female thread includes:

a constant-thread-width portion having a constant thread-ridge width; and a varying-thread-width portion having a thread-ridge width equal to the thread-ridge width of the constant-thread-width portion of the female thread or larger and gradually increasing going from the constant-thread-width portion of the female thread toward a center of the box, and wherein, when the connection has been made up, a load flank of the constant-thread-width portion of the male thread is in contact with a load flank of the constant-thread-width portion of the female thread, a stab flank of the constant-thread-width portion of the male thread is not in contact with a stab flank of the constant-thread-width portion of the female thread, and load flanks in the varying-thread-width portions are in contact with each other and stab flanks in the varying-thread-width portions are in contact each other.

2. The threaded connection according to claim 1, wherein the maximum thread-groove width of the male thread is twice the minimum thread-groove width of the male thread or smaller.

3. The threaded connection according to claim 1, wherein, during screwing of the pin into the box and at the time at which both a stab flank and a load flank of the varying-thread-width portion contact the box, the tip of the pin is not in contact with a tip of another pin that is made up together with the box, and, after both the stab flank and the load flank of the varying-thread-width portion contact the box and before the male thread yields, the tip of the pin contacts the tip of the other pin.

4. The threaded connection according to claim 1, wherein the pin further includes a shoulder surface, and the box further includes a shoulder surface provided to correspond to the shoulder surface of the pin and capable of being in contact with the shoulder surface of the pin when the connection has been made up.

5. The threaded connection according to claim 4, wherein, during screwing of the pin into the box and at the time at which both a stab flank and a load flank of the varying-thread-width portion contact the box, the shoulder surface of the pin is not in contact with the shoulder surface of the box, and, after both the stab flank and the load flank of the varying-thread-width portion contact the box and before the male thread yields, the shoulder surface of the pin contacts the shoulder surface of the box.

6. The threaded connection according to claim 1, wherein a length of the varying-thread-width portion of the female thread as measured in the pipe-axis direction is larger than a length of the varying-thread-width portion of the male thread as measured in the pipe-axis direction.

* * * * *